United States Patent [19]

Etoh et al.

[11] 4,298,928
[45] Nov. 3, 1981

[54] DATA TRANSFER SYSTEM FOR DATA EXCHANGE BETWEEN TWO OPERATION PROCESSORS

[75] Inventors: Kunihiko Etoh, Toyota; Tamotsu Ishigaki, Nagoya; Kuniyuki Niwa, Kariya, all of Japan

[73] Assignee: Toyoda-Koki Kabushiki-Kaisha, Kariya, Japan

[21] Appl. No.: 954,740

[22] Filed: Oct. 26, 1978

[30] Foreign Application Priority Data

Oct. 28, 1977 [JP] Japan .............................. 52-129985

[51] Int. Cl.³ .................................................. G06F 3/04
[52] U.S. Cl. ........................................................ 364/200
[58] Field of Search ... 364/200 MS File, 900 MS File, 364/101, 104, 107

[56] References Cited

U.S. PATENT DOCUMENTS

| | | | |
|---|---|---|---|
| 3,651,484 | 3/1972 | Smeallie ............................. | 364/200 |
| 3,810,104 | 5/1974 | Markley ............................. | 364/900 |
| 3,997,879 | 12/1976 | Markley et al. ..................... | 364/900 |
| 4,007,450 | 2/1977 | Haibt et al. ........................ | 364/200 |
| 4,029,950 | 6/1977 | Haga .................................. | 364/104 |
| 4,034,354 | 7/1977 | Simmons ............................ | 364/900 |
| 4,058,711 | 11/1977 | Ondercin et al. .................. | 364/101 |
| 4,064,395 | 12/1977 | Schubeler et al. .................. | 364/107 |
| 4,071,911 | 1/1978 | Mazur ................................ | 364/900 |
| 4,075,693 | 2/1978 | Fox et al. ............................ | 364/200 |
| 4,109,309 | 8/1978 | Johnstone et al. ................. | 364/900 X |
| 4,149,242 | 4/1979 | Pirz .................................... | 364/200 |
| 4,200,936 | 4/1980 | Borzcik et al. ..................... | 364/900 |

*Primary Examiner*—Gareth D. Shaw
*Assistant Examiner*—Eddie P. Chan
*Attorney, Agent, or Firm*—Oblon, Fisher, Spivak, McClelland & Maier

[57] ABSTRACT

A data transfer system in which a programmable sequence controller, a computerized numerical controller and a pair of data transfer devices are associated respectively with the controllers. Each of the transfer devices includes a data memory and a first read-out and write-in circuit for exchanging control data between the data memory and the associated one of the controllers. Each of the transfer devices further includes a second read-out and write-in circuit which is enabled to operate when the first read-out and write-in circuit is inoperative, for exchanging control data between the data memory and the other controller, so that the control data is transferred from the sequence controller to the numerical controller, and vice versa.

6 Claims, 7 Drawing Figures

DATA TRANSFER SYSTEM FOR DATA EXCHANGE BETWEEN TWO OPERATION PROCESSORS

BACKGROUND OF THE INVENTION

1. Field of the Invention

The present invention relates to a data transfer system for exchanging a quantity of data between two operation processing apparatuses.

2. Description of the Prior Art

Recently, full scale and complicated controls have become necessary with the development of production machines to huge sizes. In a machine tool system, a plurality of operation processing apparatuses such as a programmable sequence controller and a computerized numerical controller have been used for the executions of control functions and operation processings appropriate thereto, respectively. A need has been encountered for exchanging a quantity of control data between the processing apparatuses for the purpose of control intercommunication between the processing apparatuses.

The simplest data transfer method employed in the past is that in which a pair of input and output ports and a signal line are provided for transfer of a single signal between two operation processing apparatuses. However, such method necessitates the use of pairs of input and output ports and signal lines which correspond in number to signals to be transferred. Therefore, this method is not only difficult to practice in the instance where the number of signals to be transferred reaches more than several hundreds, but this method also disadvantageously increases the dangers of short-circuit and disconnection of the signal lines, thus resulting in the degradation of operational reliability.

These drawbacks may be obviated if a storage area, for data to be transferred, is established within a memory provided in each of the operation processing apparatuses. These apparatuses would alternately transfer the data stored in the storage area on a word (for example, 8-bits)-by-word basis. In order to execute such data transferring, however, each of the operation processing apparatuses must be given functions to write input data into the memory and to read out the data from the memory for delivery as well as a capability of identifying and processing, as input and output data, the data being stored in the memory. For this reason, where a programmable sequence controller, which has nothing but functions to test the operational states ("ON" or "OFF") of input elements in accordance with a sequence program stored in a memory and to energize or deenergize output elements in dependence upon the results of the tests, is used as the operation processing apparatus, such data transferring is not achieved. On the other hand, in the case of the operation processing apparatus composed of a general purpose digital computer, it is possible to execute the writing and reading-out of data into and from a memory of the computer. However, since the data processing according to a main control program or routine is interrupted at every occurrence of data receiving and data transmission, the more the quantity of data increases, the shorter becomes the time for the data processing according to the main control routine and this causes an inconvenience in control.

Further, there can be conceived another method in which one of two operation processing apparatuses, each composed of a general purpose digital computer, is provided with a common memory for storage of data to be exchanged therebetween and each of the processing apparatuses performs the writing and reading-out of data into and from the common memory. In this method, however, it may disadvantageously result that the two operation processing apparatuses simultaneously write data into the common memory or read out data therefrom, and in order to be prevented from such simultaneous accesses to the common memory, the two processing apparatuses must be operated in synchronous relation with each other or one of the processing apparatuses must be given preference over the other apparatus so as to cause the same to wait while it makes the access to the common memory. Additionally, since any one of the processing apparatuses which is remote from the common memory must be connected to the common memory through signal lines and photo-couplers, a considerable time is taken for the remote operation processing apparatus to execute the reading-out of data from the memory or the writing of data therein and therefore, reliable reading-out and writing-in of data cannot be carried out unless the operational cycle time of the remote operation processing apparatus is undesirably extended.

SUMMARY OF THE INVENTION

Accordingly, it is a primary object of the present invention to provide an improved data transfer system wherein each of two operation processing apparatuses or processors is able to transmit data to and receive the same from the other operation processor by making access to a data memory of a data transfer device associated therewith.

Another object of the present invention is to provide an improved data transfer system wherein each of two operation processors is associated with a data transfer device having a data memory for receiving data transferred from the other operation processor so tha. ach of the operation processors is able to speedily and reliably take out the data from the data memory of the associated data transfer device at any time.

A further object of the present invention is to provide an improved data transfer system of the character set forth above wherein operation processors are relieved of processings for data transfer while data transferring is effected between a pair of data transfer devices associated respectively therewith.

A still further object of the present invention is to provide an improved data transfer system of the character set forth above which is suitable for data transferring between two operation processors, at least one of which comprises a programmable sequence controller for controlling a sequence of machine operations in accordance with a sequence program.

Briefly, according to the present invention, there is provided a data transfer system which comprises two operation processors, each capable of outputting control data to be transferred to the other operation processor and address data, and of receiving control data output from the other operation processor, and a pair of data transfer devices associated respectively with the operation processors. Each of the transfer devices includes a data memory for storing control data transferred between the operation processors and a first read-out and write-in circuit for reading out control data from the data memory to the associated operation processor in accordance with address data applied from the associated operation processor and for writing control data, output from the associated operation processor, into a memory address of the data memory designated by address data applied from the associated operation processor. Each of the transfer devices further includes an address counter, an address designator, a transfer control circuit, a second read-out and write-in circuit, a signalling circuit, a counter address advancing circuit, and a designator address advancing circuit. The address counter outputs address data to designate a memory address of the data memory at which the control data to be transferred to the other operation processor is being stored, and the address designator outputs address data to designate a memory address of the data memory at which the control data transferred from the other operation processor is to be stored. The transfer control circuit generates control signals while the first read-out and write-in circuit is inoperative. The second read-out and write-in circuit is responsive to the control signals for reading out control data from the data memory to the other transfer device in accordance with the address data output from the address counter and for writing control data, received from the other transfer device, into a memory address of the data memory designated by the address data output from the address designator. The signalling circuit generates a write-in completion signal each time the second read-out and write-in circuit completes the writing of the control data into the data memory. The counter address advancing circuit is responsive to the write-in completion signal output from the other transfer device for advancing the content of the address counter, and the designator address advancing circuit advances the number of the address data that the address designator of the other transfer device outputs, in response to the advancement of the counter address.

In the transfer system according to the present invention, since each of the transfer devices associated respectively with the operation processors is provided with the data memory for storing control data and the second read-out and write-in circuit for transferring the control data from the data memory to the other transfer device and for writing control data transferred from the other transfer device into the data memory, each of the operation processors is able to speedily obtain control data transferred from the other operation processor. The foregoing is accomplished only by making access to the data memory of the associated transfer device and by transferring control data to the other operation processor only by writing the control data into the data memory of the associated transfer device. In addition, each of the operation processors is relieved of processing responsibilities for data transference between the transfer devices so that highly efficient use of each of the operation processors is achieved. Particularly, since it is unnecessary for each of the operation processors to incorporate therein a memory device for storage of control data to be transferred between itself and the other operation processor, there can be used as at least one of the operation processors a programmable sequence controller which does not have such a data processing function as does a conventional general purpose digital computer. Also, even where such a digital computer is used as one of the operation processors, it is freed from interrupting the execution of a control program by data transfer processings, and thus, any effect caused by such interruption on the operation of a controlled object (e.g. a numerically controlled machine tool) can advantageously be avoided. In addition, since each of the operation processors is able to make access to the data memory of the associated transfer device at any time and in a short period of time, it is unnecessary to decrease a processing cycle speed of each of the operation processors. Consequently, each of the operation processors is permitted to operate at the fastest speed thereof.

BRIEF DESCRIPTION OF THE DRAWINGS

Various other objects, features and attendant advantages of the present invention will readily be appreciated as the same becomes better understood from the following detailed description of a preferred embodiment when considered in connection with the accompanying drawings, wherein like reference numerals designate like or corresponding parts throughout the several views, and in which.

DETAILED DESCRIPTION OF A PREFERRED EMBODIMENT

Figure 1:
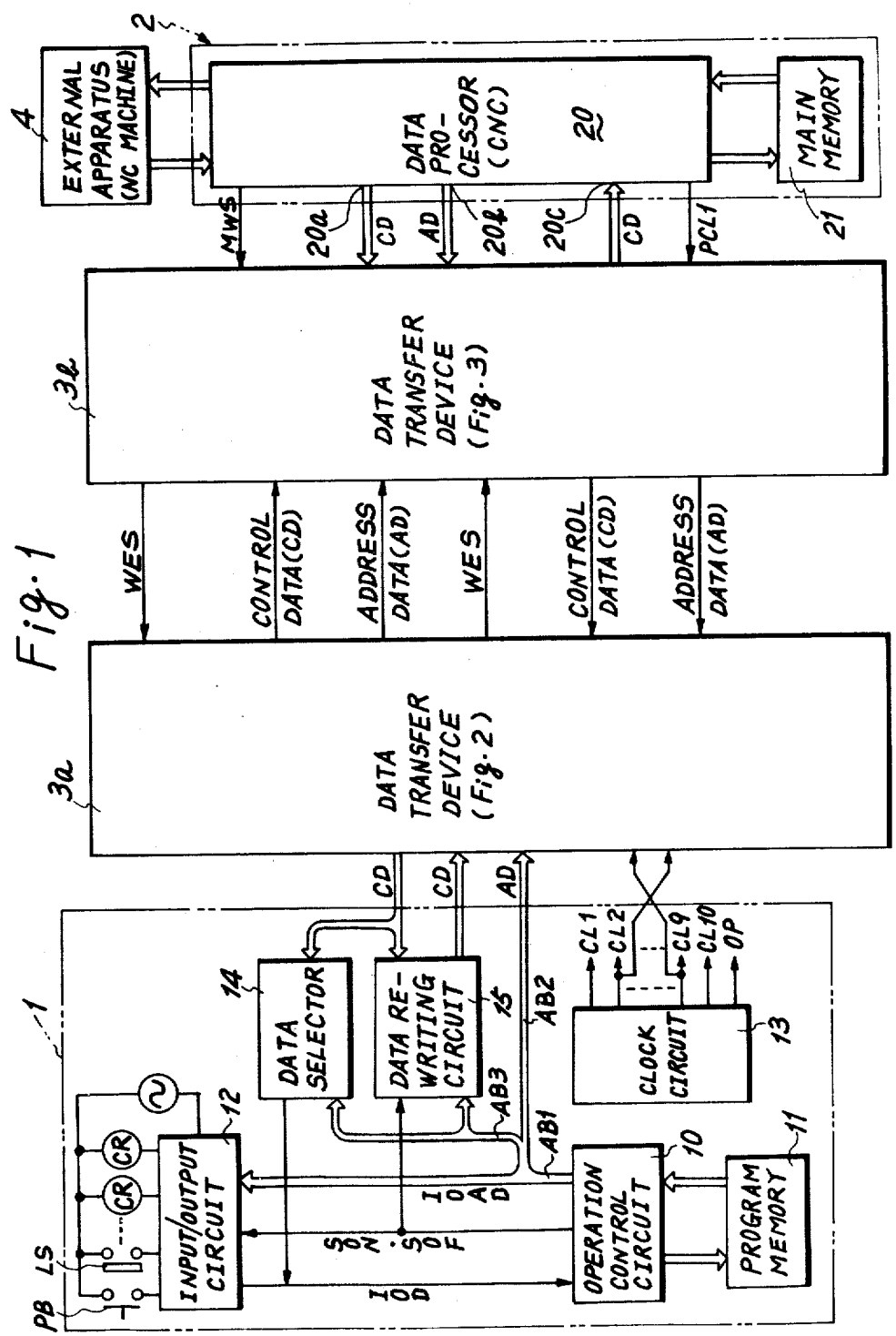
FIG. 1 is a block diagram illustrative of the constructional outline of a data transfer system according to the present invention, together with that of a programmable sequence controller constituting a part of the transfer system.
Figure 5:
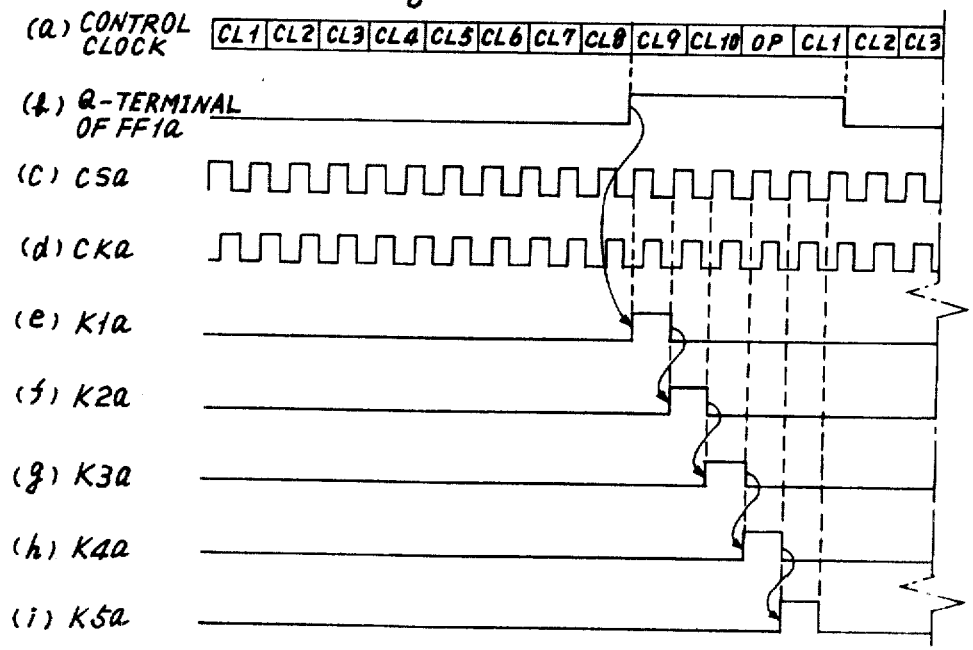
FIG. 5 is a time chart showing a time relation between a series of control clocks and a series of transfer clocks.

Referring now to the drawings and particularly to FIG. 1 thereof, there is shown a data transfer system comprising two operation processing apparatuses 1 and 2 and a pair of data transfer devices 3a and 3b associated respectively therewith. The operation processing apparatus 1 is exemplified as a programmable sequence controller which is of hardware construction composed primarily of an operation control circuit 10, a program memory 11, an input/output (I/O) circuit 12, and a clock circuit 13. The program memory 11 stores a plurality of program instructions constituting a sequence program. Each of the program instructions is represented in the form of, for example, a 16-bit data signal, which includes a 5-bit test or output command and the remaining 11-bit input or output (I/O) address data IOAD. The operation control circuit 10 operates in synchronism with various sequence control clocks CL1–CL10 and OP, which are generated from the clock circuit 13 with a time allocation as shown in FIG. 5, and alternatively performs the reading-out of a program instruction from the program memory 11 and the execution of the read-out program instruction. In this particular embodiment, the operation control circuit 10 is enabled to read out a program instruction within a period that the first to fifth control signals CL1–CL5 are generated in and to execute the read-out program instruction within a period that the sixth to eighth control signals CL6–CL8 are generated in.

The I/O circuit 12 is provided for selecting, from a plurality of input and output elements, such as a push button switch PB, a limit switch LS and magnetic relays CR, one input or output element which is designated by I/O address data IOAD applied from the operation control circuit 10 through an I/O address bus AB1. The operational state of the selected input or output element is supplied as an ON or OFF signal IOD to the operation control circuit 10 so as to be read thereinto. An energization signal SON or a deenergization signal SOF, output from the operation control circuit 10 in dependence upon an output command, is applied together with I/O address data IOAD to the I/O circuit 12, so that the same is enabled to select and energize or deenergize an output element designated by the I/O address data IOAD. The operation control circuit 10 reads the ON or OFF signal IOD in a program cycle wherein a test command is read-out from the program memory 11 and sends out the energization or deenergization signal SON or SOF in another program cycle wherein an output command is read out from the memory 11. The reading of the ON or OFF signal IOD and the sending-out of the energization or deenergization signal SON or SOF are carried out respectively when the eighth control clocks CL8 are generated in the respective program cycles, and the transferring of signals between the operation control circuit 10 and the I/O circuit 12 is not carried out with any other timing than the eighth control clock CL8.

Figure 2:
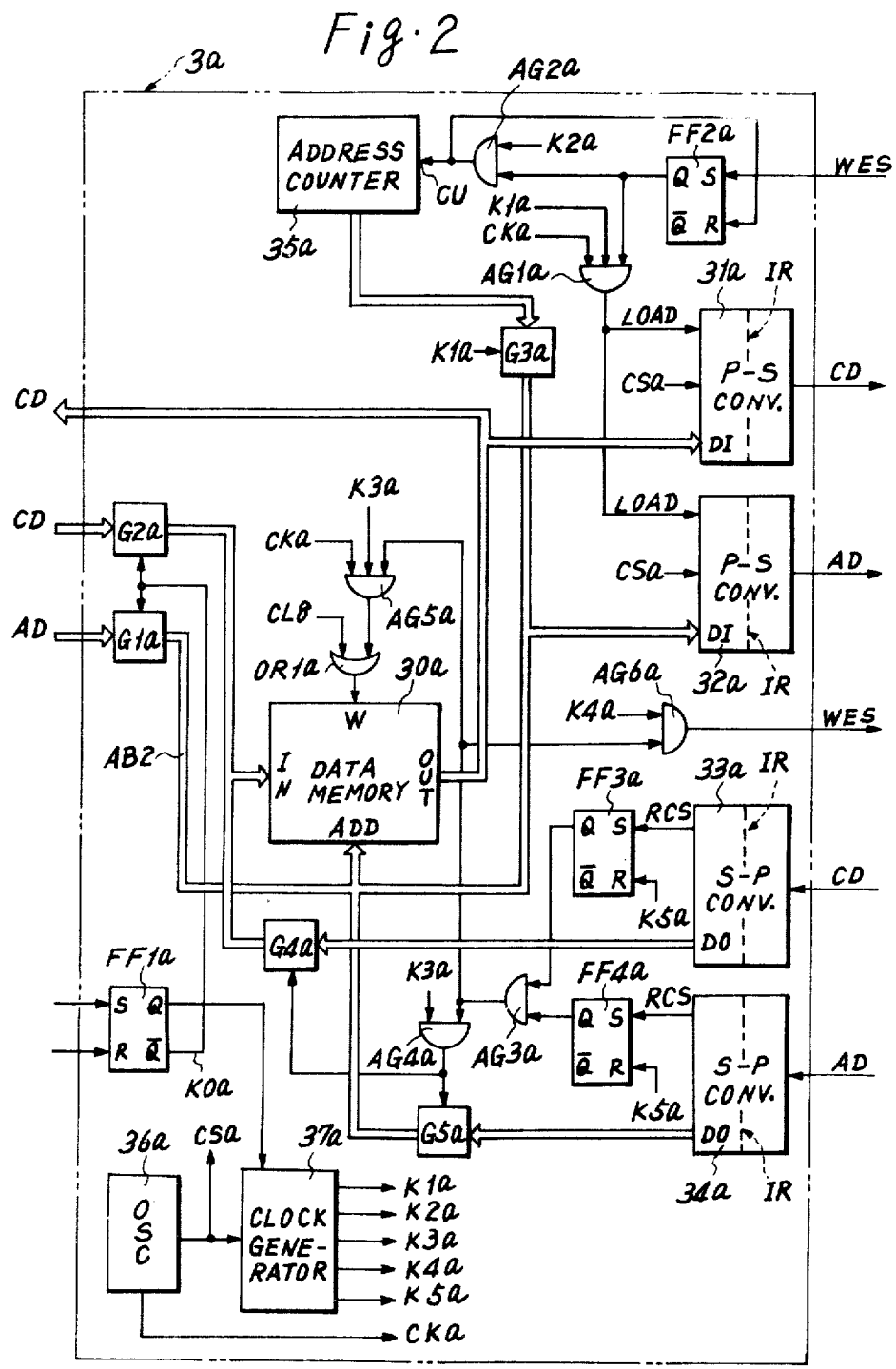
FIG. 2 is a detailed block diagram of one of the data transfer devices shown in FIG. 1.

The sequence controller 1 is further composed of a conventional data selector 14 for applying to the operation control circuit 10 a part of control data read out from a data memory 30a, shown in FIG. 2, of the data transfer device 3a and a data rewriting circuit 15 for writing into the data memory 30a control data sent out from the operation control circuit 10. Each of the selector 14 and the rewriting circuit 15 receives less significant 3-bit data of the I/O address data IOAD from the operation control circuit 10 through a selection address bus AB3 so as to select one bit from 8-bits constituting the control data which is read-out as one word from the data memory 30a. The data selector 14 applied the signal status "1" or "0", appearing on the selected one bit, as the ON or OFF signal IOD, namely as an input in a sequence control, to the operation control circuit 10. The rewriting circuit 15 renews the 8-bits control data by rewriting the signal status of the selected one bit to "1" or "0" which is designated by the energization signal SON or the deenergization signal SOF applied from the operation control circuit 10, and sends the 8-bit data back to the data memory 30a for storage therein. Further, separated from the 11-bit I/O address bus AB1 is an 8-bit memory address bus AB2, which, as shown in FIG. 2, reaches through a first gate G1a and 8-bit address terminal ADD of the data memory 30a so as to apply thereto 8-bit address data. The data memory 30a, when receiving the address data, selects an address designated thereby and reads out one word data being stored at the selected address for application to each of the data selector 14 and the rewriting circuit 15, so that the above-noted 3-bit address data enables each of the selector 14 and the rewriting circuit 15 to select one bit of the read-out one word data. The application by the selector 14 of the one bit data to the operation control circuit 10 and the rewriting by the rewriting circuit 15 of the one bit data are carried out at the generation of the eighth control clock CL8 in respective cycles.

Figure 4:
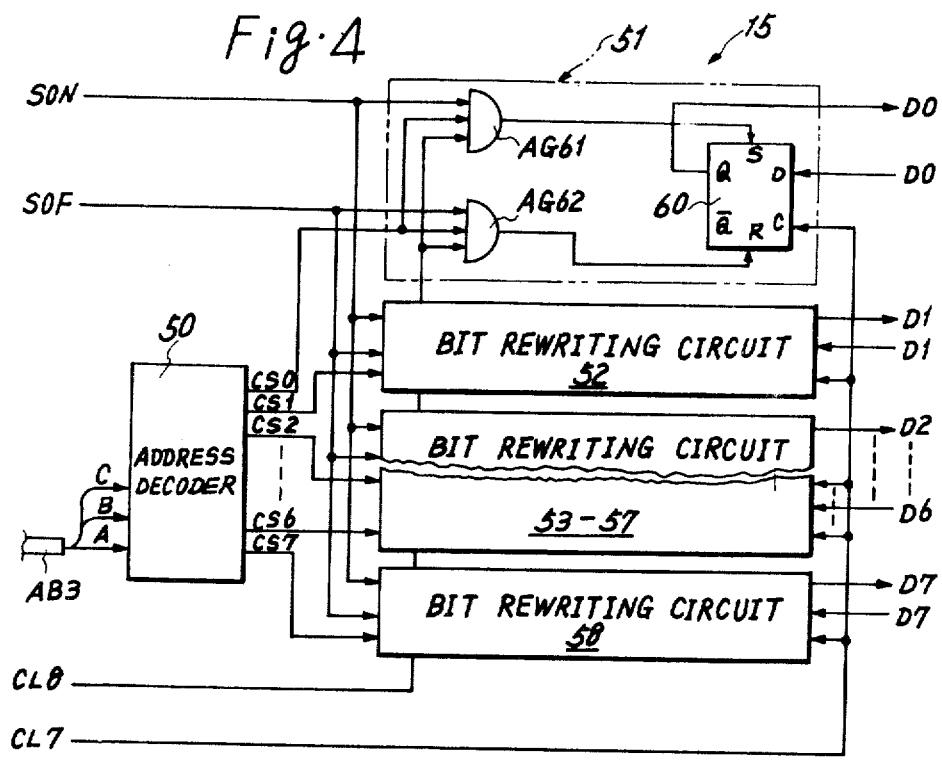
FIG. 4 is a detailed block diagram of a data rewriting circuit shown in FIG. 1.

FIG. 4 illustrates the detailed circuit diagram of the rewriting circuit 15, which comprises an address decoder 50 and first to eighth bit-rewriting circuits 51–58 for the 8-bit control data read-out from the data memory 30a. The address decoder 50, when given the 3-bit address data from the operation control circuit 10, generates one of first to eighth selection signals CS0–CS7. As typically illustrated in respect to the first bit-rewriting circuit 51, each of the rewriting circuits 51–58 is composed of a pair of AND gates AG61 and AG62, which are opened when respectively receiving the energization signal SON and the deenergization signal SOF in addition to the eighth control clock CL8 and the corresponding one of the selection signals CS0–CS7, and a D-type flip-flop 60 whose set and reset terminals are connected respectively to output terminals of the AND gates AG61, AG62. The flip-flop 60 is responsive to the seventh control clock CL7 so as to store the signal status of a corresponding one of the 8-bit data which are applied from the data memory 30a to a D-terminal thereof, and rewrites the stored signal status by being set or reset in dependence upon the opening of the AND gate AG61 or AG62. It will, therefore, be realized that renewed 8-bit data whose one bit has been rewritten are sent respectively from Q-terminals of the flip-flops 60 back to a gate G2a of the data transfer device 3a, whereby a data transfer from the sequence controller 1 to the transfer device 3a is accomplished.

Figure 3:
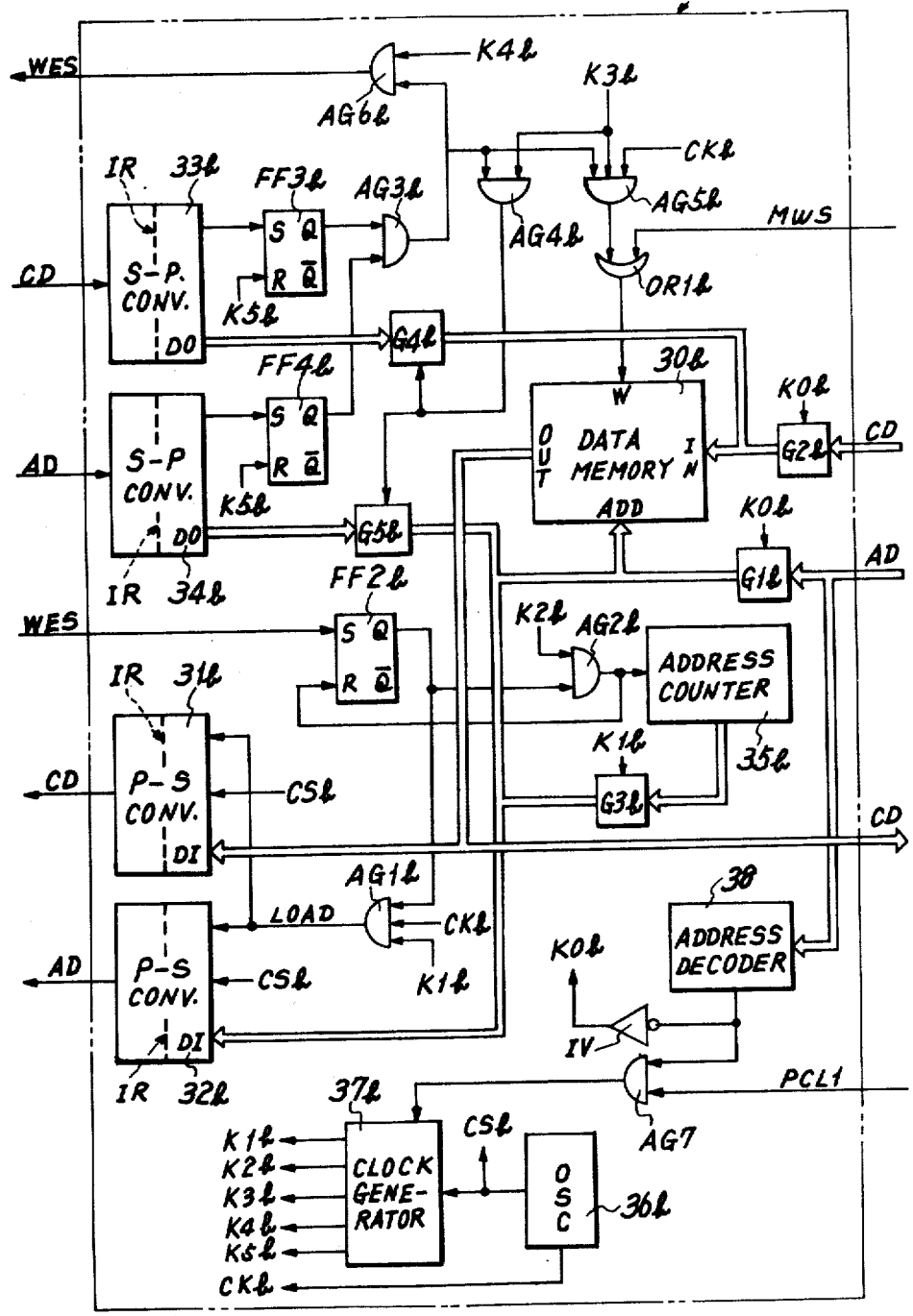
FIG. 3 is a detailed block diagram of the other data transfer device shown in FIG. 1.

The other operation processing apparatus 2 is exemplified, in this particular embodiment, as a so-called "computerized numerical controller", which is composed primarily of a data processor 20 such as a conventional digital micro-computer or mini-computer and of a main memory 21 and is programmed to execute processings or operations for numerical control and quality control so as to thereby control an external apparatus 4 such as a numerically-controlled machine tool. The detailed description of the data processor 20 and the external apparatus 4 is omitted since the same do not form any essential parts of the present invention. It should, however, be noted that in order to designate any desired address of a data memory 30b, shown in FIG. 3, of the other data transfer device 3b and to read out and write control data from and into the data memory 30b on a word-by-word basis, the data processor 20 is provided with input and output ports 20a-20c each suitable for 8-bit data.

The data transfer devices 3a, 3b are of the same construction except that they have different circuits for detecting non-accesses by the sequence controller 1 and the numerical controller 2 to the data memories 30a and 30b, respectively. Therefore, circuit components that perform the same function are indicated by like reference numerals, but by appending small letters "a" and "b" to the reference numerals, are distinguished as to whether they are of the transfer device 3a or of the transfer device 3b, respectively.

Description will be made hereinunder regarding, chiefly, the data transfer device 3a. The transfer device 3a comprises the data memory 30a, a pair of parallel to serial (hereinafter called "P-S") data converters 31a and 32a, a pair of serial to parallel (hereinafter called "S-P") data converters 33a and 34a, an address counter 35a, an oscillator 36a, a clock generator 37a, flip-flops FF1a–FF4a, gates G1a–G5a, and AND gates AG1a–AG6a. Each of the above-noted converters is known as a "universal asynchronous receiver transmitter IM6402" manufactured by Intersil Inc., Calif. The function of the flip-flop FF1a is to detect the non-access by the sequence controller 1 to the data memory 30a. The flip-flop FF1a is connected to be set upon receipt of the ninth control clock Cl9 sent out from the clock circuit 13 of the sequence controller 1 and to be reset upon receipt of the second control clock CL2 in a successive cycle. Thus, the setting of the flip-flop FF1 is effected at the generation of the ninth control clock CL9 so as to inhibit the access by the operation control circuit 10 to the data memory 30a and thereafter, is kept during a period in which the ninth to first control clocks CL9, CL10, OP and CL1 are successively generated. In the period during which the flip-flop FF1a is kept set so as to inhibit the access by the sequence controller 1 to the memory 30a, the reading-out and writing of control data from and into the data memory 30a are executed for data transfer between the transfer devices 3a and 3b.

The clock generator 37a is provided for controlling openings of the gates G1a–G5a and the AND gates AG1a–AG6a so as to effect timely data transfer. The clock generator 37a is responsive to the leading edge of a signal output from a set output terminal Q of the flip-flop FF1a so as to send out once a series of transfer control clocks K1a–K5a as shown in (e)–(i) of FIG. 5 is synchronism with a reference clock CSA as shown in (c) of FIG. 5. Therefore, each time the flip-flop FF1a is set, the transfer control clocks K1a–K5a are successively output. A clock CKa, output from the oscillator 36a, acts as a strobe signal for use in writing data into the data memory 30a. The clock CKa is narrower in width of pulse than each of the transfer control clocks K1a–K5a, as shown in FIG. 5, and, each time of the generation of any one of the clocks K1a–K5a, is generated with leading and trailing edges thereof which are respectively later and earlier than those of each of the clocks K1a–K5a.

The data memory 30a is of a rewritable type and has a memory capacity meeting the quantity of data to be exchanged. As the data memory 30a in this embodiment, there is employed a random access memory RAM having 256-word storage addresses, each of which is comprised of 8-bits. Of the storage addresses, addresses 0–127 are used for storage of data to be transferred to the data transfer device 3b, while the remaining addresses 128–255 are used for storage of data which are transferred from the data transfer device 3b. An 8-bit address terminal ADD of the data memory 30a is connected to the gate G1a so as to receive therethrough the more significant 8-bit data of the I/O address data IOAD output from the sequence controller 1. The gate G1a is opened upon receiving a control signal K0a from a reset output terminal Q of the flip-flop FF1a, and during such opening of the gate G1a, the designation of an address to the memory 30a is performed in accordance with the 8-bit data output from the operation control circuit 10. An 8-bit data output terminal OUT of the memory 30a is connected to the data selector 14 and the rewriting circuit 15 of the sequence controller 1 so as to supply the 8-bit data to the selector 14 and the circuit 15. An 8-bit data input terminal IN of the memory 30a is connected to the gate G2a, which is opened in response to the control signal K0a, so as to receive the renewed 8-bit control data from the rewriting circuit 15 through the gate G2a. Accordingly, the flip-flop FF1a, while outputting the control signal K0a, enables the sequence controller 1 to write data into and read out the same from the data memory 30a.

The address terminal ADD of the memory 30a is connected also to the address counter 35a so as to receive therefrom address data which designates control data to be read out, through the gate G3a which is opened in response to the transfer control clock K1a applied from the clock generator 37a. When the generation of the first clock K1a causes the opening of the gate G3a, a memory address of the data memory 30a is designated by the address data output from the address counter 35a, and control data being stored in such a designated address is read out therefrom, being sent out from the data output terminal OUT. This read-out data is applied to a data input terminal D1 of the P-S converter 31a, and the address data from the address counter 35a is applied also to a data input terminal DI of the P-S converter 32a through the gate G3a. The address counter 35a is so arranged as to cyclically designate the memory addresses 0 to 127.

Each of the P-S converters 31a and 32a is for converting 8-bit data applied thereto in parallel form, into serial form, and is connected at a load terminal LOAD thereof to an output terminal of the AND gate AG1a. Further, each of the P-S converters 31a and 32a has an internal register IR which is capable of simultaneously storing the 8-bit data having been applied to the data input terminals DI when the load terminal LOAD receives a signal from the AND gate AG1a. Accordingly, the P-S converters 31a and 32a, when receiving at the load terminals LOAD the signal from the AND gate AG1a, respectively store in the internal registers IR the control data and the address data having been applied from the data memory 30a and the address counter 35a, and respectively serially send out the control data and the address data in synchronism with the reference clock CSA output from the oscillator 36a.

The flip-flop FF2a constitutes together with the AND gate AG2a an incrementing circuit for advancing the content of the address counter 35a step-by-step. The flip-flop FF2a is connected to receive at a set terminal S thereof a write-in completion signal WES output from the data transfer device 3b and is settable by the completion signal WES. A set output terminal Q of the flip-flop FF2a is connected to an input terminal of each of the AND gates AG1a, AG2a so as to apply a signal thereto. Other input terminals of the AND gate AG1a are connected to receive the first transfer control clock K1a and the strobe signal Cka, and the other input terminal of the AND gate AG2a is connected to receive the second transfer control signal K2a. An output terminal of the AND gate AG2a is connected to a count-up terminal CU of the address counter 35a and a reset terminal R of the flip-flop FF2a, so that the opening of the AND gate AG2a causes the address counter 35a to increment its content and at the same time, the flip-flop FF2a to be reset. It will, therefore, be understood that, when the write-in completion signal WES from the data transfer device 3b effects the setting of the flip-flop FF2a, the control data from the data memory 30a and the address data from the address counter 35a are loaded respectively into the P-S converters 31a and 32a at the generation of both of the first transfer control clock K1a and the strobe signal CKa, and the content of the address counter 35a is then incremented at the generation of the second transfer control clock K2a.

The data memory 30a is further connected at the address terminal ADD to the gate G5a so as to receive therethrough address data from the S-P converter 34a and at the data input terminal IN to the gate G4a so as to receive therethrough control data from the S-P converter 33a. The function of each of the converters 33a, 34a is to serially receive 8-bit signals of any data from the data transfer device 3b and to convert the data into parallel data. Each of the converters 33a, 34a is provided with an internal register IR for temporary storage of the received data elements as well as for simultaneous applications of the same to an 8-bit data output terminal DO. In addition, each of the converters 33a, 34a is arranged to output a receipt completion signal RCS upon completing receipt of all of the 8-bit data elements. Flip-flops FF3a and FF4a for storing the receipt completions by the converters 33a and 34a of data are connected to receive at set input terminals S thereof the receipt completion signals RCS from the converters 33a and 34a and are responsive to the fifth transfer control clock K5a so as to respectively be reset thereby. The set output terminals Q of the flip-flops FF3a and FF4a are connected respectively to input terminals of the AND gates AG3a, an output terminal of which is in turn connected to an input terminal of each of the AND gates AG4a-AG6a. The AND gate AG4a is connected to receive the third transfer control clock K3a at the other input terminal thereof and controls the openings and closings of the gates G4a, G5a. The AND gate AG5a has two other input terminals to respectively receive the third transfer clock K3a and the strobe signal CKa and, when opened, applies a signal to a write-in terminal W of the data memory 30a through an OR gate OR1a, which is also connected to receive the eighth sequence control clock CL8 from the clock circuit 13 of the sequence controller 1. The AND gate AG6a is connected to receive the fourth transfer clock K4a at the other input terminal and, when opened, applies a write-in completion signal WES to the data transfer device 3b. Therefore, the flip-flops FF3a and FF4a, when set, cause the opening of the AND gate AG3a with a result that control data which has been transferred from the transfer device 3b, together with address data for designation of a memory address into which the control data is to be written, it supplied to the memory 30a. This occurs when the gates G4a and G5a are opened based upon the generation of the third transfer control clock K3a and the data is written into the memory address when the strobe signal CKa is generated in addition to the third transfer control clock K3a. The generation of the fourth transfer control clock K4a enables the AND gate AG6a to send out the write-in completion signal WES, thereby informing the data transfer device 3b of the completion of writing the control data into the data memory 30a.

Although the data transfer device 3b is of almost the same construction as the aforementioned data transfer device 3a, a circuit which is provided in the transfer device 3b for detecting the non-access by the numerical controller 2 to the data memory 30b is different from that provided in the transfer device 3a, and an address counter 35b of the transfer device 3b is also different from that of the transfer device 3a in the extent of addresses that they designate. Specifically, the circuit for detecting the non-access to the memory 30b is composed of an address decoder 38, an inverter IV and an AND gate AG7. For checking whether the memory 30b has been subjected to access by the numerical controller 2 or not, the address decoder 38 is connected to receive any address data from the numerical controller 2 and operates to output a signal at the non-application of the address data to the memory 30b. This signal is applied to one input terminal of the AND gate AG7 as well as to the inverter IV, which thus outputs a control signal K0b. The AND gate AG7 is connected at the other input terminal thereof to the data processor 20 so as to receive a first control clock PCL1 that the processor 20 first generates at every processing cycle thereof, and at an output terminal to a clock generator 37b so as to apply a clock generation instruction thereto. It will, therefore, be apparent that the clock generator 37b is enabled to generate a series of transfer control clocks K1b-K5b, in accordance with which the transferring of any data is carried out.

Unlike the address counter 35a, the address counter 35b is arranged to circulate between address numbers 128–255. of 255-addresses of the memory 30b, addresses 0–127 are assigned to areas into which control data received from the transfer device 3a are written, while addresses 128–255 are assigned to areas into which control data to be transferred to the transfer device 3a are written. Such assignment of memory addresses makes it possible to avoid the interference between the data to be transferred and the received data.

Figure 6:
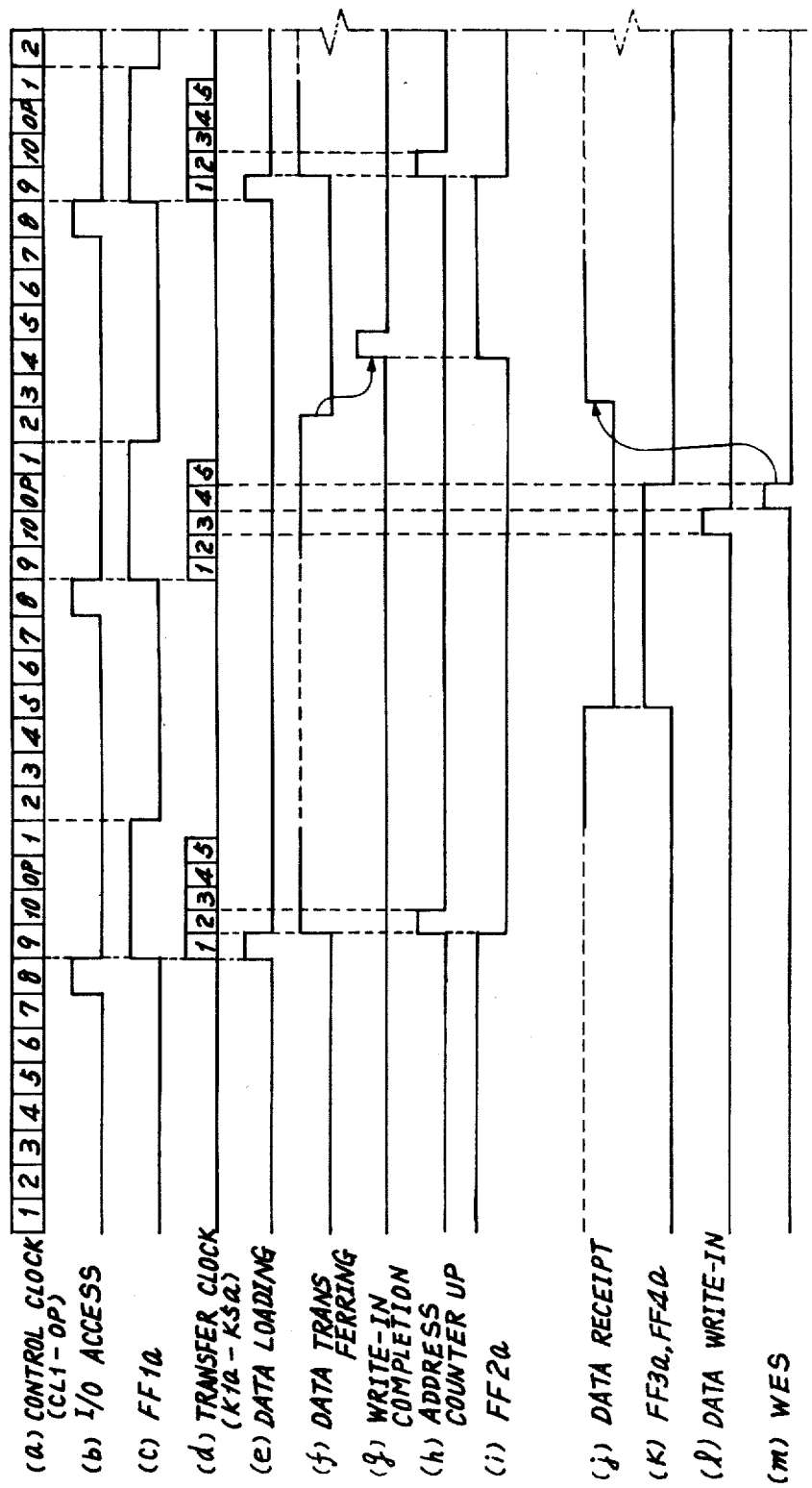
FIG. 6 is a time chart for explaining the operation of one of the data transfer devices.
Figure 7:
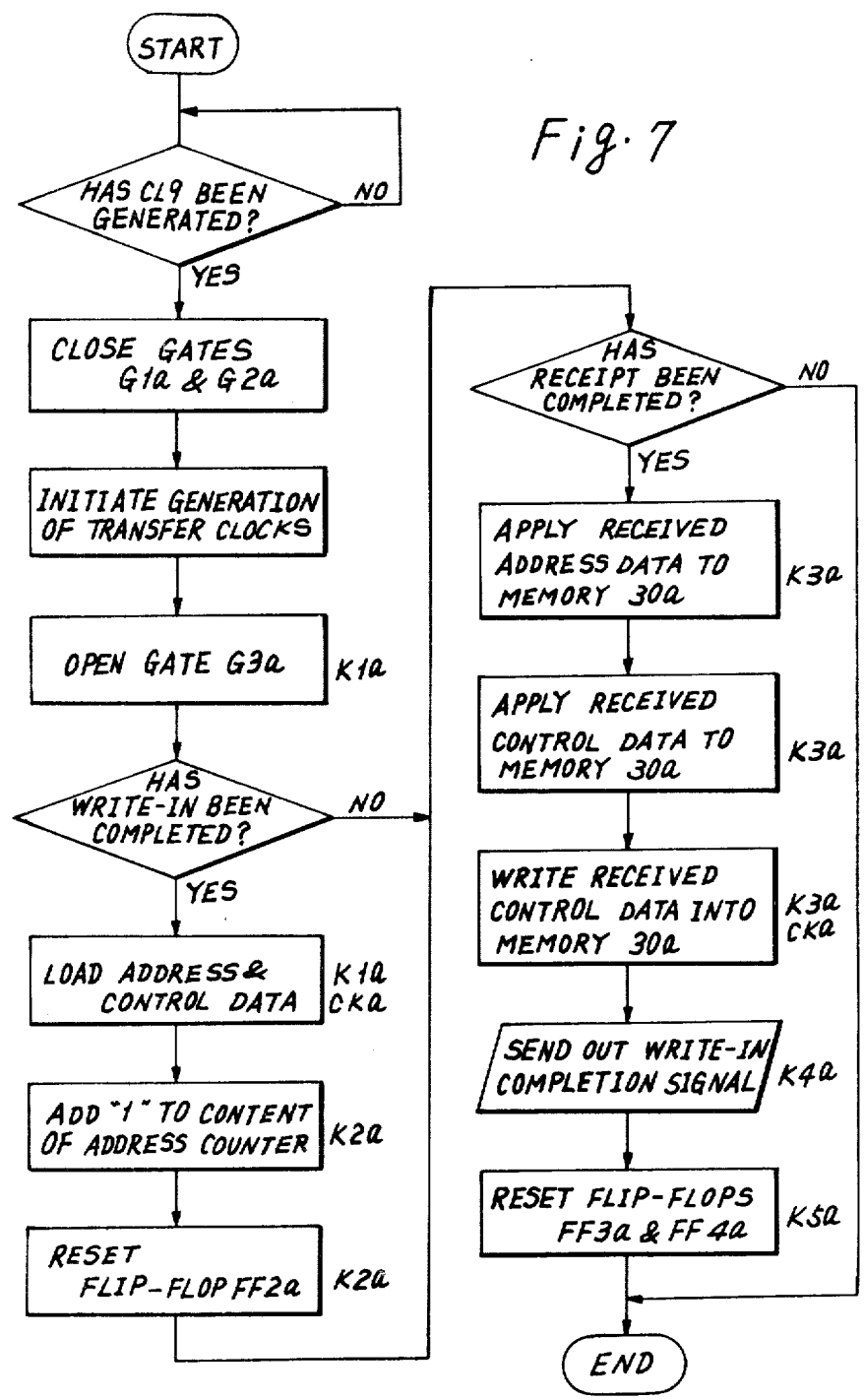
FIG. 7 is a flow chart for explaining the operation of one of the data transfer devices.

The operation of the data transfer system as constructed above will be described hereafter with reference to a time chart shown in FIG. 6 as well as to a flow chart shown in FIG. 7. The fade-out of the eighth sequence control clock CL8 causes the operation control circuit 10 to terminate the access to the I/O circuit 12 or the data memory 30a, and the generation of the ninth sequence control clock CL9 effects the setting of the flip-flop FF1a, which thus inhibits the access by the sequence controller 1 to the memory 30a. Since the flip-flop FF1a, when set, discontinues outputting the control signal K0a from its reset output terminal $\overline{Q}$, the gates G1a and G2a are closed to thereby isolate the memory 30a from communication with the sequence controller 1. The flip-flop FF1a, when set, outputs from the set output terminal Q a signal, whose leading edge is detected by the clock generator 37a, which thus generates the series of the transfer control clocks K1a-K5a.

At the generation of the first transfer control clock K1a, the gate G3a is opened to apply address data, outputted from the address counter 35a, to the address terminal ADD of the memory 30a as well as to the data input terminal DI of the P-S converter 32a. The control data that is being stored at an address designated by the address data is thus read out from the memory 30a and is applied to the data input terminal DI of the P-S converter 31a. Let it be assumed herein that the data transfer device 3b has outputted the write-in completion signal WES as it completed the writing of the previously received data into the memory 30b. Since the flip-flop FF2a has already been set, the AND gate AG1a is opened upon receiving the strobe signal CKa in addition to the first transfer control signal K1a, so as to apply a signal to the load terminals LOAD of the P-S converters 31a and 32a. Consequently, the control data and the address data having been outputted from the data memory 30a and the address counter 35a are loaded into the P-S converters 31a and 32a, which thus initiate the serial transferrings of the control data and the address data, respectively.

The subsequent generation of the second transfer control clock K2a effects the opening of the AND gate AG2a, which thus increments the content of the address counter 35a so as to change the previously designated address to the next, and simultaneously, effects the resetting of the flip-flop FF2a. Following this, the third transfer control clock K3a is generated and applied to the AND gates AG4a and AG5a. Assuming now that each of the S-P converters 33a, 34a has not yet completed the receipt of control data or address data whose data elements are serially transferred from the data transfer device 3b, the flip-flops FF3a and FF4a are still in the reset state, so that the writing of such control data into the memory 30a is not executed.

The operation of the sequence controller 1 then enters into a successive control cycle. When the clock circuit 13 generates the second sequence control clock CL2, the flip-flop FF1a is reset to re-open the gates G1a and G2a. As recalled herein, in each sequence control cycle, the operation control circuit 10 of the sequence controller 1 initiates the reading-out of a sequence instruction from the program memory 11 from the time that the first sequence control clock CL1 is generated, and then initiates the execution of the read-out sequence instruction from the time that the sixth sequence control clock CL6 is generated. Therefore, if the read-out sequence instruction includes a test command and address data which designates any one of memory addresses 128-255 of the data memory 30a, control data being stored at such designated memory address is read out from the memory 30a to the data selector 14 and the rewriting circuit 15. The selector 14 selects one data element of the read-out 8-bit control data in accordance with less significant 3-bit data of the address data IOAD and applies the one data element to the operation control circuit 10 for use as one input in controlling the energization or deenergization of an output relay. On the other hand, if the read-out sequence instruction includes an output command and address data which designates any one of memory addresses 0-127 of the memory 30a, control data being stored at such designated memory address is read out from the memory 30a to the data selector 14 and the rewriting circuit 15. Eight data elements of the read-out data are applied respectively to the D-terminals of the flip-flops 60 of the bit rewriting circuits 51-58 shown in FIG. 4 and then, are stored respectively in the flip-flops 60 when the same receive the seventh sequence control clock CL7 at the C-terminals. The address decoder 50 outputs one of the selection signals CS0-CS7 to select one of the bit rewriting circuits 51-58 in accordance with the less significant 3-bit address data supplied from the operation control circuit 10. As one of the AND gates AG61, AG62 of the selected bit rewriting circuit receives an energization or deenergization signal SON or SOF and the eighth sequence control clock CL8 in addition to the selection signal, it is opened to set or reset the associated flip-flop FF60, whereby the read-out data is renewed as having a part or one data element thereof rewritten. The data, renewed in this manner, is immediately applied to the data input terminal IN of the memory 30a through the gate G2a being still opened, and the eighth sequence control clock CL8 is applied also to the write-in terminal W of the memory 30a through the OR gate OR1a. Thus, the renewed data element, together with the remaining old data elements, is written into the address designated by the address data being still applied to the address terminal ADD, namely into the address at which it was stored, and will be transferred to the transfer device 3b for use as an input to the numerical controller 2. It will be noted herein that where the sequence controller 1 is used to control the sequence control operation of the numerically controlled machine tool 4, the sequence control operation and the numerical control operation of the machine tool 4 are performed in liaison with each other.

When the ninth sequence control clock CL9 is generated from the clock circuit 13, the flip-flop FF1a is again set, which causes the closings of the gates G1a and G2a and the generation by the clock generator 37a of the series of the transfer control clocks K1a-K5a. During this transfer control cycle, each of the P-S converters 31a and 32a continues the serial transferring of data elements of the control or address data that it received from the memory 30a or the counter 35a in the previous transfer control cycle, and no write-in completion signal is applied from the data transfer device 3b so as to keep the flip-flop FF2a reset. This does not result in the openings of the AND gates AG1a and AG2a even at the generation of the first and second transfer control clocks K1a and K2a, so that neither the data loadings into the converters 31a, 32a nor the incrementing of the content of the counter 35a is carried out.

Assuming now that in the transfer control cycle, each of the S-P converters 33a and 34a completes the receipt of all data elements of control data or address data which are serially transferred from the transfer device 3b, then the converters 33a and 34a output the receipt completion signals respectively to flip-flops FF3a and FF4a, which are thus set with the result of rendering the AND gate AG3a to output a signal. The outputting of the signal from the AND gate AG3a results in opening the gates G4a and G5a at the generation of the third transfer control clock K3a and also in applying a signal to the write-in terminal W of the memory 30a at the time that the third transfer control clock K3a and the strobe signal CKa are simultaneously generated. Consequently, the control data that has been received by the S-P converter 33a is written into an address of the memory 30a designated by the address data that the S-P converter 34a has received. Thereafter, the AND gate AG6a is opened in response to the fourth transfer control clock K4a so as to deliver the write-in completion signal WES to the transfer device 3b, and the flip-flops FF3a and FF4a are reset in response to the fifth transfer control clock K5a.

The writing of the received control data into the memory 30a is completed in the foregoing manner, and upon receipt of the write-in completion signal WES, the data transfer device 3b reads out a successive control data from the memory 30b and serially transfers data elements of the successive control data to the transfer device 3a. Further, when the transfer device 3b completes the writing into the memory 30b of the control data that the S-P converter 33b has received, then the write-in completion signal WES is applied from the transfer device 3b so as to set the flip-flop FF2a again. At the generation of the first transfer control clock K1a, control data being stored at an address that the address counter 35a designates is read out from the memory 30a and is transferred from the P-S converter 31a to the S-P converter 33b. The address counter 35a is caused to increment its content when the second transfer control clock K2a is subsequently generated. The foregoing operations are repeatedly executed, whereby all of the control data that have been stored in addresses 0-127 of the memory 30a are transferred into addresses 0-127 of the memory 30b, respectively, while all of the control data that have been stored in addresses 128-255 of the memory 30b are transferred into addresses 128-255 of the memory 30a, respectively. Since it takes several tens of milliseconds to complete the transferring of all of 256-data words, the time delay ranging up to several tens of milliseconds may occur until one of the sequence controller 1 and the numerical controller 2 responds to a control data signal that the other of the controllers 1 and 2 sent out. It is, however, realized that the time delay of such range will not raise any inconvenience in executing conventional sequence control and numerical control. Further, it is to be noted that an OR gate OR1b receives a signal MWS from the numerical controller 2 when the same applies control data to the data memory 30b.

As described above, the data transferring between the memories 30a and 30b is performed without any intervention by the operation processors 1 and 2, and any one of these operation processors 1 and 2 is able to obtain data or information transferred from the other processor only by making the access to the associated memory 30a or 30b acting as input an output elements and also to transfer data to the other operation processor by writing the data into the associated memory 30a or 30b. This advantageously results not only in permitting the programmable sequence controller of a hardware construction type to perform data transfer, but also in keeping the operation of the operation processor 2 from being interrupted while data transfer operation is executed between the transfer devices 3a and 3b.

Although the above described embodiment is directed to a data transfer system wherein data transfer is performed between a programmable sequence controller and a general purpose digital computer, the present invention is otherwise applicable to a data transfer system wherein data transfer is carried out between two programmable sequence controllers or between two general purpose digital computers. It is apparent that in the case of data transfer between two programmable sequence controllers, the transfer device 3b is replaced by that which has the same construction as the transfer device 3a, while in the case of data transfer between two digital computers, the transfer device 3a is replaced by that which has the same construction as the transfer device 3b. In the above-described embodiment, serial transfer of data is performed between the transfer devices 3a and 3b for the purpose of decreasing the number of communication lines. However, parallel transfer of data may be possible in the case where an increase in the number of communication lines is permitted. Further, although in the above-described embodiment, the transferring of address data is carried out between the data transfer devices 3a and 3b for designation of memory addresses into which transferred control data are written, such designation of write-in addresses is otherwise achieved by providing in each of the transfer devices 3a and 3b a write-in address counter which operates in synchronism with the address counter 35b or 35a of the other transfer device 3b or 3a and which selectively designates memory addresses of the memory 30a or 30b provided in the associated transfer device 3a or 3b.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A data transfer system comprising:

two operation processors each capable of outputting control data and address data to be transferred to the other of said two operation processors; and a pair of data transfer devices associated respectively with said two operation processors and each including addressable data memory means for storing said control data and said address data to be transferred between said two operation processors;

first signal generating means connected to an associated one of said operation processors for generating a first transfer control signal during the time when said associated one of said operation processors accesses said data memory means;

first access means connected between said data memory means and said associated one of said operation processors and operated in response to said first transfer control signal for transferring said control data therebetween;

an address counter for outputting address data to selectively designate memory addresses of said data memory means;

first and second data transmitters for transferring said control data and address data in serial fashion upon receiving the same in parallel fashion, respectively;

second signal generating means connected to said first signal generating means for periodically and selectively generating second and third transfer control signals during the time when said first signal generating means is not generating said first transfer control signal;

second access means connected between said address counter, said data memory means and said first and second data transmitters and operated in response to said second transfer control signal for applying said address data from said address counter to said data memory means and said second data transmitter and for applying to said first data transmitter said control data read out from said data memory means;

first and second data receivers connected to said first and second data transmitters provided in the other of said data transfer devices for receiving therefrom said control data and said address data in serial fashion so as to output the same in parallel fashion, respectively;

third access means connected to said first and second data receivers and said data memory means and operated in response to said third transfer control signal for storing said control data output from said first data receiver in one of said memory addresses of said data memory means designated by said address data output from said second data receiver; and counter address advancing means connected to said first and second data receivers and also connected to said address counter provided in said other data transfer device for applying a signal to increment the content of said address counter provided in said other data transfer device connected thereto each time both of said first and second data receivers complete receipt of said control data and said address data.

2. A data transfer system as set forth in claim 1, wherein; at least one of said two operation processors is a programmable sequence controller having a program memory for storing a sequence control program and adapted to execute a plurality of sequence control cycles in accordance with said sequence control program for testing operational states of a plurality of input elements connected thereto and for energizing or deenergizing a plurality of output elements connected thereto based upon results of the tests.

3. A data transfer system as set forth in claim 2, wherein said programmable sequence controller includes:
- data selecting means connected to said data memory means of one of said data transfer devices for selecting a part of said control data supplied from said data memory means so as to use the selected part of said control data as an input signal in sequence control operations; and
- data rewriting means connected to said data memory means of said one of said data transfer devices for rewriting a part of said control data, supplied from said data memory means, in accordance with the result of said tests and for outputting to said data memory means said control data having the rewritten part.

4. A data transfer system as set forth in claim 3, wherein said first access means provided in said one of said data transfer devices comprises:
- a first data bus for applying said address data from said programmable sequence controller to said data memory means of said one of said data transfer devices;
- a second data bus for applying said control data having said rewritten part from said data rewriting means to said data memory means of said one of said data transfer devices;
- a third data bus for applying said control data read out from said data memory means of said one of said data transfer devices to said data selecting means; and
- first and second gates provided respectively on said first and second data buses and adapted to be operated in response to said first transfer control signal.

5. A data transfer system as set forth in claim 2 or 4, wherein:
- the other of said two operation processors is a computerized numerical controller incorporating a digital computer for controlling feed movement of a machine tool, connected thereto, in accordance with numerical control data.

6. A data transfer system as set forth in claim 5, wherein:
- said first signal generating means provided in said other data transfer device and connected to said numerical controller is arranged to generate said first transfer control signal upon receiving from said numerical controller address data to designate any one of said memory addresses of said data memory means provided in said other data transfer device.

* * * * *